United States Patent
Forte et al.

(10) Patent No.: US 11,738,648 B2
(45) Date of Patent: Aug. 29, 2023

(54) ENDOTHERMIC/ELECTRIC HYBRID PROPULSION SYSTEM FOR A VEHICLE

(71) Applicant: ELDOR CORPORATION S.P.A., Orsenigo (IT)

(72) Inventors: Pasquale Forte, Castiglione d'Orcia (IT); Luca Zai, Turin (IT)

(73) Assignee: ELDOR CORPORATION S.P.A., Orsenigo (IT)

(*) Notice: Subject to any disclaimer, the term of this patent is extended or adjusted under 35 U.S.C. 154(b) by 214 days.

(21) Appl. No.: 17/257,289

(22) PCT Filed: Jul. 17, 2019

(86) PCT No.: PCT/IB2019/056092
§ 371 (c)(1),
(2) Date: Dec. 30, 2020

(87) PCT Pub. No.: WO2020/016793
PCT Pub. Date: Jan. 23, 2020

(65) Prior Publication Data
US 2021/0229558 A1 Jul. 29, 2021

(30) Foreign Application Priority Data
Jul. 19, 2018 (IT) .................. 102018000007329

(51) Int. Cl.
*B60L 15/20* (2006.01)
*B60K 1/02* (2006.01)
(Continued)

(52) U.S. Cl.
CPC ............... *B60L 50/16* (2019.02); *B60K 1/02* (2013.01); *B60K 6/24* (2013.01); *B60K 6/26* (2013.01);
(Continued)

(58) Field of Classification Search
CPC .......... B60L 50/16; B60L 15/20; B60K 1/02; B60K 6/24; B60K 6/26; B60K 6/28; B60K 6/36
See application file for complete search history.

(56) References Cited

U.S. PATENT DOCUMENTS 7,764,044 B2* 7/2010 Ishikawa ............... B60K 6/445
320/132
9,457,795 B2* 10/2016 Imai ....................... B60K 6/52
(Continued)

OTHER PUBLICATIONS

International Search Report and Written Opinion dated Nov. 19, 2019 from counterpart International Patent Application No. PCT/IB2019/056092.

*Primary Examiner* — John D Walters
(74) *Attorney, Agent, or Firm* — Shuttleworth & Ingersoll, PLC; Timothy J. Klima

(57) ABSTRACT

An endothermic/electric hybrid propulsion system for a vehicle comprises a first propulsion unit, of the electrical type, provided with at least a first electric machine (EM1) coupled to a transmission shaft, a second propulsion unit, of the hybrid type, provided with an output shaft and comprising at least one internal combustion engine (ICE) and at least one second electric machine (EM2) which can be selectively coupled together to provide torque to the output shaft in an independent or combined manner and a coupling member operatively interposed between the output shaft of the second propulsion unit and the transmission shaft of the first propulsion unit.

16 Claims, 11 Drawing Sheets

Figure 1:
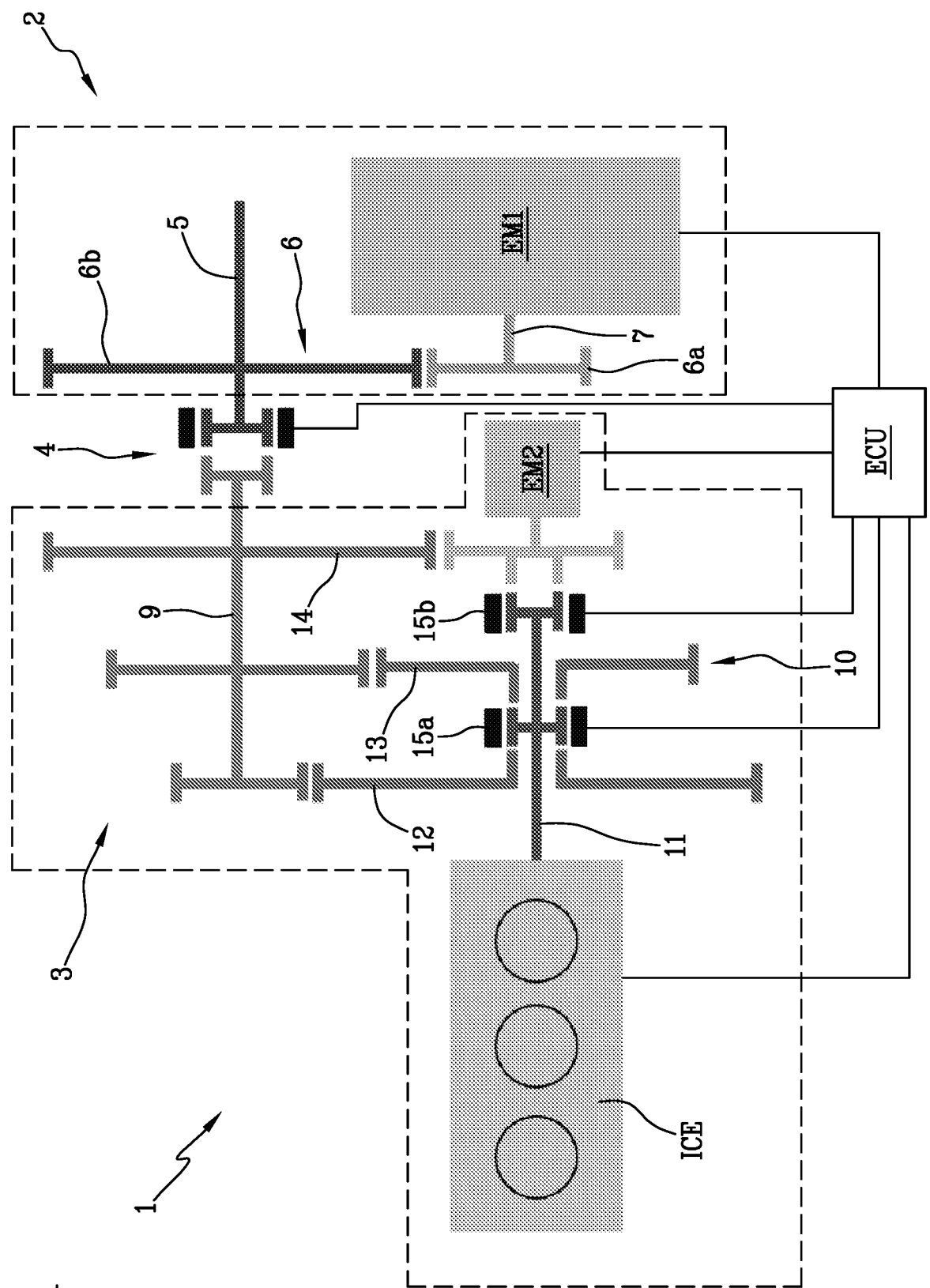

(51) Int. Cl.
  *B60K 6/24*    (2007.10)
  *B60K 6/26*    (2007.10)
  *B60K 6/36*    (2007.10)
  *B60L 50/16*   (2019.01)
  *B60K 6/28*    (2007.10)

(52) U.S. Cl.
  CPC .................. *B60K 6/28* (2013.01); *B60K 6/36* (2013.01); *B60L 15/20* (2013.01); *B60Y 2200/92* (2013.01); *B60Y 2300/18* (2013.01)

(56) References Cited

U.S. PATENT DOCUMENTS

| | | |
|---|---|---|
| 10,035,502 B2 * | 7/2018 | Hokoi ................... B60K 6/445 |
| 2008/0067973 A1 | 3/2008 | Ishikawa et al. |
| 2015/0046011 A1 | 2/2015 | Imai et al. |
| 2017/0349157 A1 | 12/2017 | Hokoi et al. |

\* cited by examiner

Fig.16
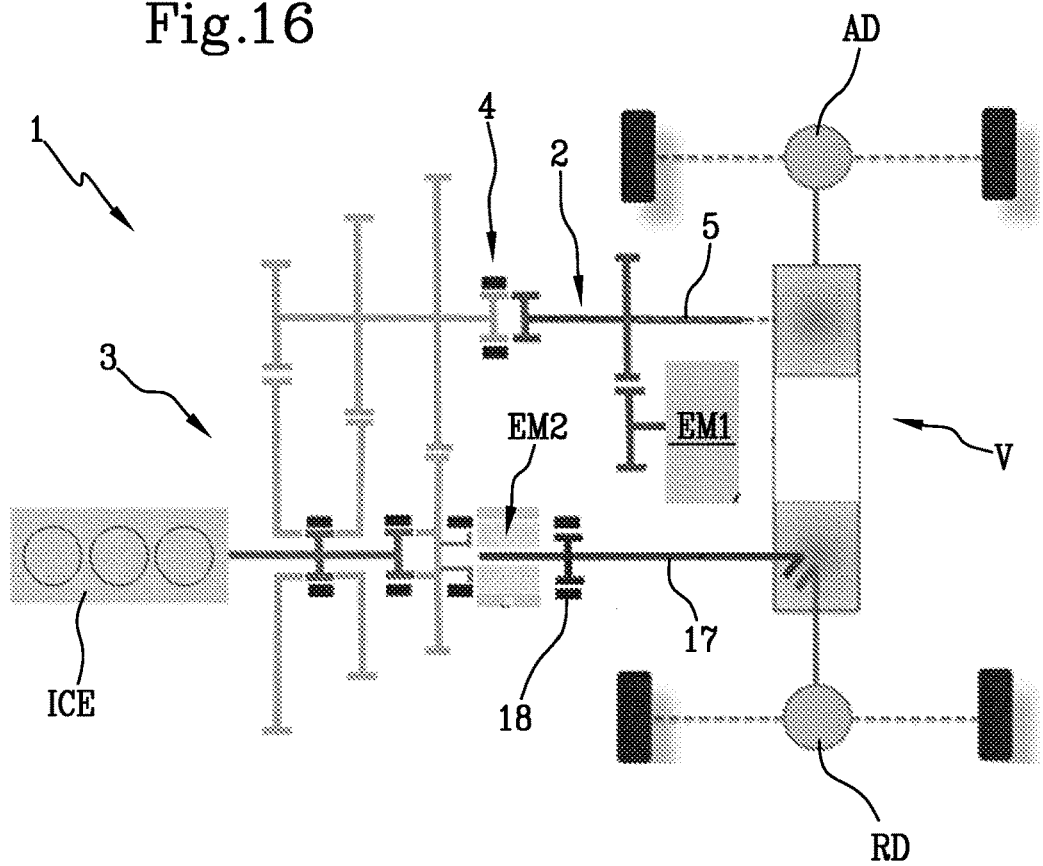
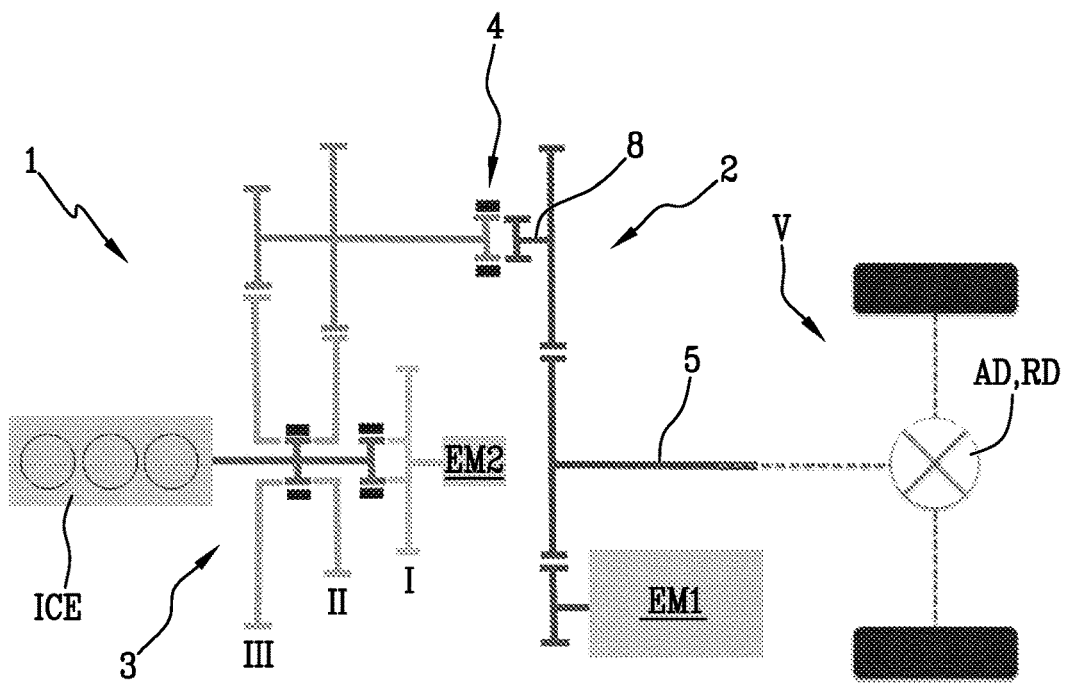
Fig.17

ENDOTHERMIC/ELECTRIC HYBRID PROPULSION SYSTEM FOR A VEHICLE

This application is the National Phase of International Application PCT/IB2019/056092 filed Jul. 17, 2019 which designated the U.S.

This application claims priority to Italian Patent Application No. 102018000007329 filed Jul. 19, 2018, which application is incorporated by reference herein.

The present invention concerns a propulsion system for a vehicle, in particular for a hybrid endothermic/electric propulsion vehicle.

The present invention is therefore particularly applicable to the automotive sector and, more precisely, to the production of hybrid propulsion vehicles.

The automobile industry has, in fact, in recent years committed more and more resources to the design and production of propulsion systems that could reduce the consumption of fossil fuel and the resulting emissions into the atmosphere.

The solution that is currently the most industrially developed is undoubtedly the so-called "hybrid", in which the internal combustion engine, which is deliberately small in size, is used in combination with a propulsion system of another kind, typically an electric one.

The endothermic/electric hybrid propulsion type designs known today are numerous, beginning with those developed and put on the market at the beginning of the century up to those of more recent manufacture.

The designs, to date, are commonly classified according to codes ranging from P0 to P4, each one representing a peculiar combination between the endothermic source and the electric one.

For example, on the one hand, the P0 design envisages the electric machine as connected to the internal combustion engine by the auxiliary timing belt (i.e. the service belt).

The P1 design, on the other hand, envisages the electric machine as connected directly to the crankshaft of the internal combustion engine.

Disadvantageously, in addition to the reduced deliverable torque, these designs do not allow the uncoupling of the electric machine from the internal combustion engine, which significantly limits the applications.

Better performing solutions include, for example, those identified by the code P2 and those that follow.

The P2 design is very similar to the P1 design, but it envisages the electric machine as connected either laterally or in series, but always downstream of a clutch or uncoupling member and operatively upstream of the transmission.

The P3 design, on the other hand, envisages the electric machine as connected to the output shaft of the mechanical transmission, in any case in the presence of a clutch that allows the internal combustion engine to be uncoupled from the electric machine.

The P4 design has a different configuration, wherein the electric machine is uncoupled from the internal combustion engine and is located on the drive axle (typically rear).

Another well-known solution is the one commonly called eCVT or Powersplit, which was developed by Toyota, wherein two electric machines and an internal combustion engine can be selectively coupled together by means of an epicyclic gear, which allows power to be supplied to the wheels by using the energy of the most appropriate source(s).

As can be immediately deduced from the brief summary above, all the known solutions have drawbacks, which result in performance limits or excessive construction complexity (i.e. cost).

In fact, the arrangement of an electric machine directly coupled to the internal combustion engine gives the system a reduced efficiency and prevents the optimal use of both sources of power.

In addition, the solutions known today do not allow totally independent driving, even in the presence of clutches or uncoupling members.

In light of the above, one purpose of the present invention is to provide an endothermic/electric hybrid propulsion system for a vehicle that is capable of avoiding the drawbacks of the prior art mentioned above.

In particular, one purpose of the present invention is to provide an endothermic/electric hybrid propulsion system for a vehicle that is versatile and simple to produce.

In addition, one purpose of the present invention is to provide an endothermic/electric hybrid propulsion system for a vehicle that is capable of optimising the efficiency of its traction members.

Furthermore, one purpose of the present invention is to provide an endothermic/electric hybrid propulsion system at a reduced cost that can easily be applied to a wide range of vehicles without substantial modifications.

Said purposes are achieved by an endothermic/electric hybrid propulsion system for a vehicle having the features of one or more of the following claims.

In particular, said purposes are obtained from an endothermic/electric hybrid propulsion system for a vehicle comprising a first propulsion unit, of the electrical type, provided with at least a first electric machine coupled to a transmission shaft.

Preferably, said transmission shaft is coupled to a differential of said vehicle.

The propulsion system also comprises a second propulsion unit of the hybrid type.

The second propulsion unit is provided with an output shaft and comprises at least one internal combustion engine and at least a second electric machine.

The internal combustion engine and the second electric machine can be selectively coupled together to provide torque to said output shaft independently or in combination.

Preferably, the propulsion system also comprises a coupling member operatively interposed between the output shaft of the second propulsion unit and the transmission shaft of the first propulsion unit.

The coupling member can, preferably, be selectively switched between an engagement condition, in which it couples said first and said second propulsion unit, and a disengagement condition, in which it disengages the second propulsion unit from the first propulsion unit.

Advantageously, the first and the second propulsion units can thus be selectively coupled so as to manage the torque transfer in a plurality of different modes.

In fact, thanks to the design of the propulsion system that is the object of the invention, it is possible to combine the benefits, and limit the defects, of many hybrid designs known today, ensuring maximum versatility of driving and a reduced complexity of construction.

Preferably, the second propulsion unit comprises a transmission device operatively interposed between the internal combustion engine and the second electric machine.

More preferably, the transmission device has at least one first operating condition wherein it allows the transmission of torque from the second electric machine to the internal combustion engine and vice versa.

Preferably, moreover, the transmission device has at least one second operating condition wherein it disengages the internal combustion engine from the second electric machine in order to allow the transmission of torque from the second electric machine to the output shaft.

Note that, preferably, in the first operating condition, the transmission device allows the transmission of torque between the second electric machine and the internal combustion engine through said output shaft. It is the presence of the coupling member that allows this since, when it is in a disengaged condition, it enables you to direct the second propulsion unit independently of the vehicle's wheels.

Preferably, the transmission device comprises a plurality of gearsets defining a corresponding plurality of transmission ratios between an input shaft and said output shaft of the second propulsion unit. Note that the internal combustion engine is coupled to the input shaft, preferably without the aid of any clutch.

More preferably, the transmission device comprises at least a first, a second and a third gearset defining a first, a second and a third transmission ratio, respectively, between the input shaft and the output shaft.

At least two selector members are provided, operatively interposed between the input shaft and said gearsets.

Preferably, a first selector member is provided, operatively interposed between the input shaft and said first gearset.

In addition, a second selector member is provided, operatively interposed between the input shaft and said second and third gearsets, so as to couple the shaft with one of the gearsets or to disengage it from them.

Note that, preferably, the first, second and third transmission ratios are ordered according to decreasing value, from a maximum value corresponding to a gearing down of the input shaft speed (i.e. low gear) to a minimum value corresponding to a high gearing up of the input shaft speed (i.e. high gear).

Note that "transmission ratio" in the present text means a value corresponding to the ratio between the input shaft rotation speed and the output shaft rotation speed ($\omega_{in}/\omega_{out}$), or to the ratio between the output shaft torque and the input shaft torque ($T_{out}/T_{in}$).

Preferably, moreover, the transmission device comprises at least one coupling device operatively interposed between said input shaft and said second electric machine.

This coupling device can be selectively switched between a first configuration, wherein it directly couples the input shaft with the second electric machine, and a second configuration, wherein it disengages the input shaft from the second electric machine.

Advantageously, the second electric machine can thus be coupled to the endothermic engine either directly, through the input shaft, or indirectly, through the output shaft.

This means that the transmission ratio between the second electric machine and the internal combustion engine can be varied appropriately, according to requirements.

In this respect, note that, preferably, the first electric machine is larger than the second electric machine.

In particular, the ability to gear up or down the transmission ratio between the input shaft and the second electric machine allows a reduced size for the second electric machine itself, the breakaway torque of which may be considerably lower than that required by the starting of the internal combustion engine.

Preferably, the second electric machine has a rotation axis coaxial with said input shaft.

The propulsion system therefore comprises a control unit configured to direct said first and second propulsion units in a plurality of operating configurations.

Preferably, the control unit is configured to direct the first and second propulsion units in at least one first electric propulsion configuration, wherein the coupling member is in said disengagement condition and said first electric machine transmits torque to the transmission shaft.

Preferably, the control unit is configured to direct the first and the second propulsion units in at least a second electric propulsion configuration, wherein the coupling member is in said engagement condition, said first electric machine transmits torque to the transmission shaft, said second electric machine transmits torque to said output shaft of the second propulsion unit and said internal combustion engine is uncoupled from said output shaft.

Preferably, the control unit is configured to direct the first and second propulsion units in at least one electric-hybrid transition configuration, wherein the coupling member is in said disengagement condition and said second electric machine transmits torque to the internal combustion engine.

Advantageously, the second electric machine can thus start the internal combustion engine and/or synchronise the rotation speed of the output shaft with the transmission shaft, without necessarily requiring the presence of synchronisers and clutch.

Preferably, in this transition configuration, the control unit is configured to direct the coupling device in said second configuration and the second selector member so as to engage the third gearset with said input shaft and maximise the transmission ratio between the second electric machine and the internal combustion engine.

Advantageously, it is thus possible to reduce the size of the second electric machine, all to the benefit of the system's compactness and cost.

Moreover, in the transition configuration, the control unit is preferably configured to direct the second electric machine and the internal combustion engine so as to bring the output shaft of the second propulsion unit to the same rotation speed as the transmission shaft of the first propulsion unit.

Advantageously, a synchronisation step is thus carried out, which is completely managed by the second electric machine, without necessarily requiring the aid of the synchronisation devices and clutch.

Preferably, moreover, the control unit is configured to direct the first and the second propulsion units in at least one hybrid propulsion configuration, wherein the coupling member is in said engagement condition, said first electric machine transmits torque to the transmission shaft and said second electric machine transmits torque to said output shaft of the second propulsion unit.

Note that, advantageously, the ability to supplement the torque supplied by the internal combustion engine with that of the second electric machine, allows the internal combustion engine to be kept within its optimal operating zone, with high efficiency (low consumption), compensating for the differences with respect to it, in positive or negative terms, thanks to the electric machines.

In this respect, the control unit is preferably configured to direct the first and second propulsion units in at least one regeneration configuration, wherein:
  the coupling member is in said disengagement condition,
  the internal combustion engine transmits torque to the second electric machine;

the second electric machine transmits electrical energy to the battery pack or directly to the first electric machine;

the first electric machine transmits torque to the transmission shaft.

Figure 2:
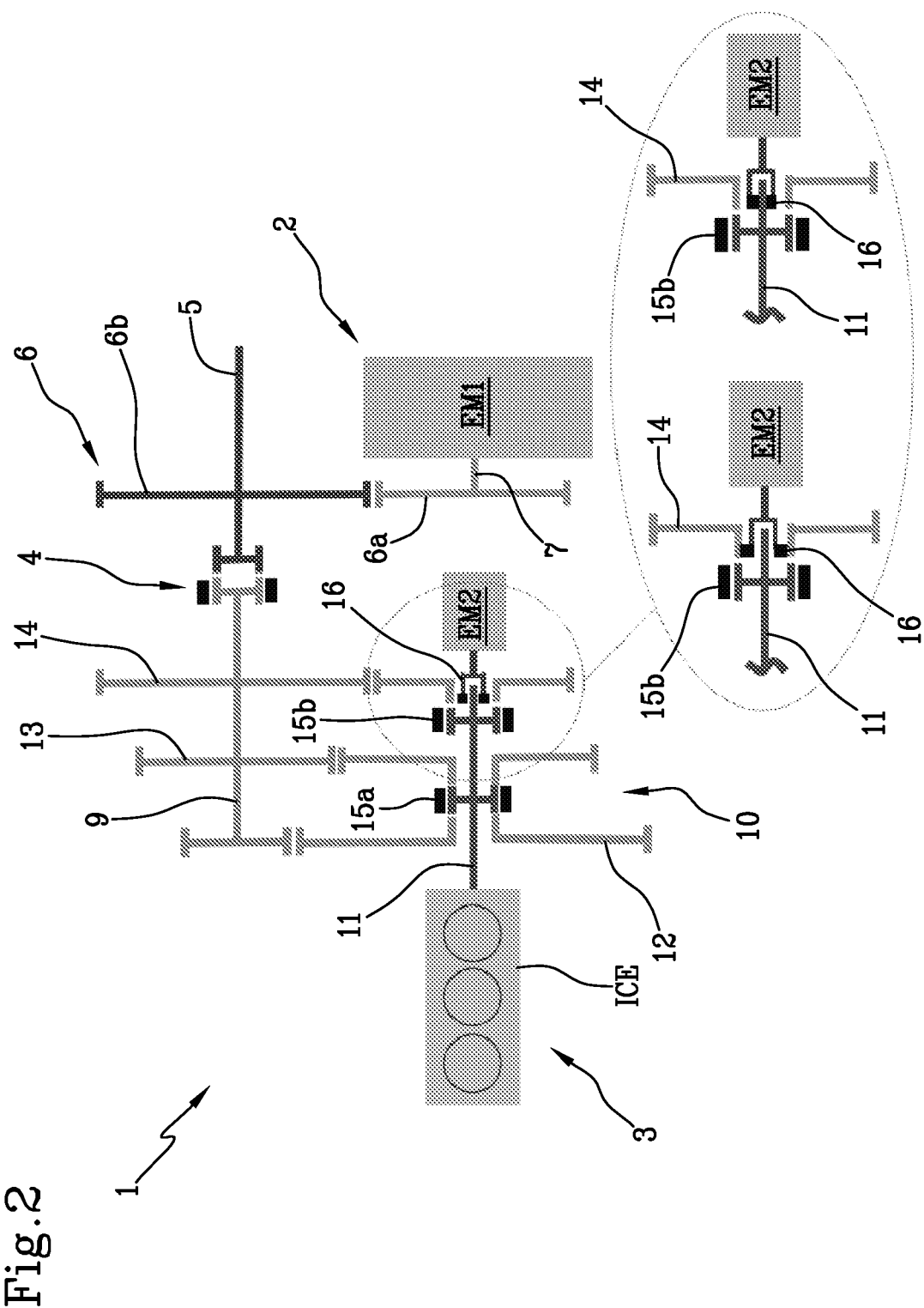
Figure 3:
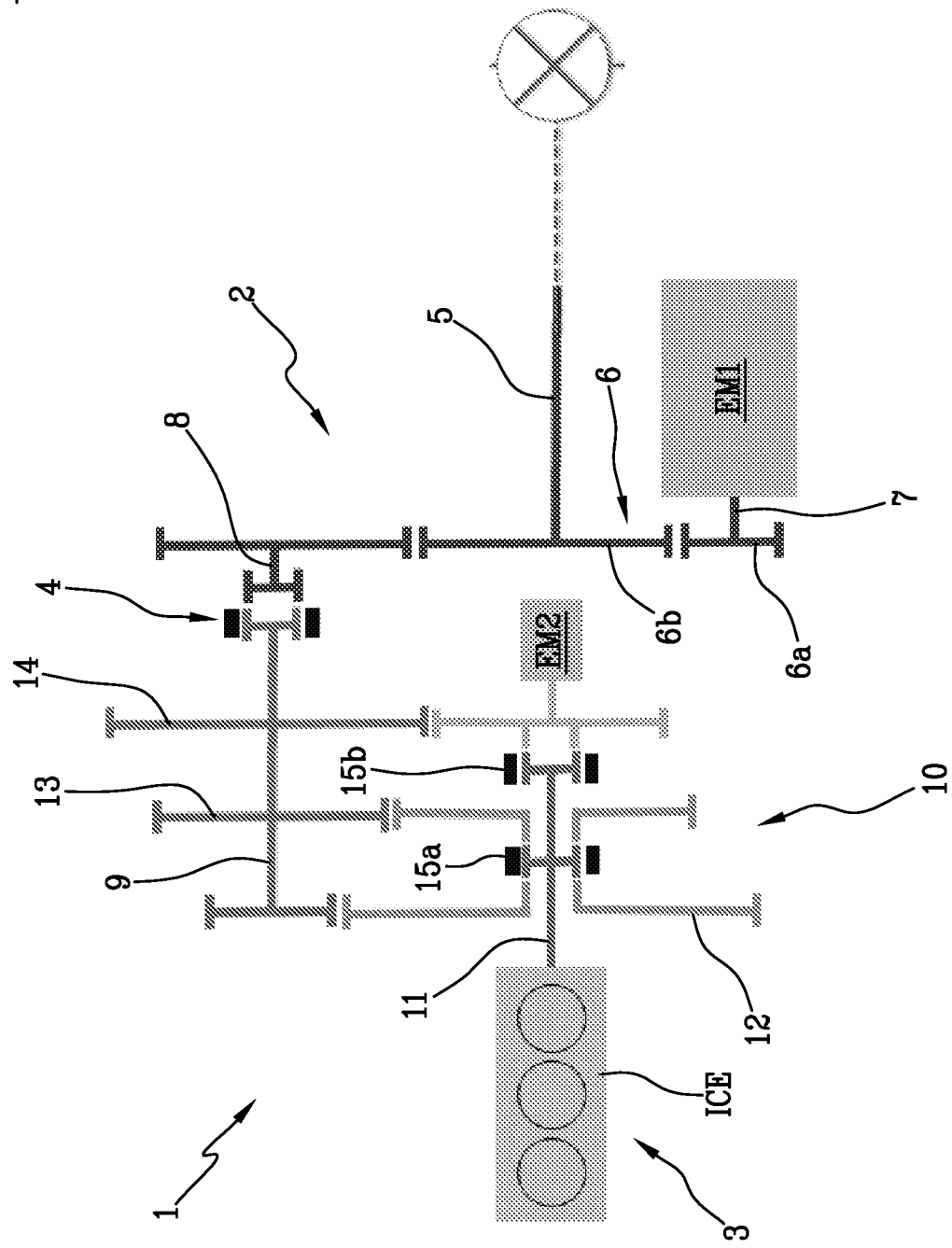
Figure 4:
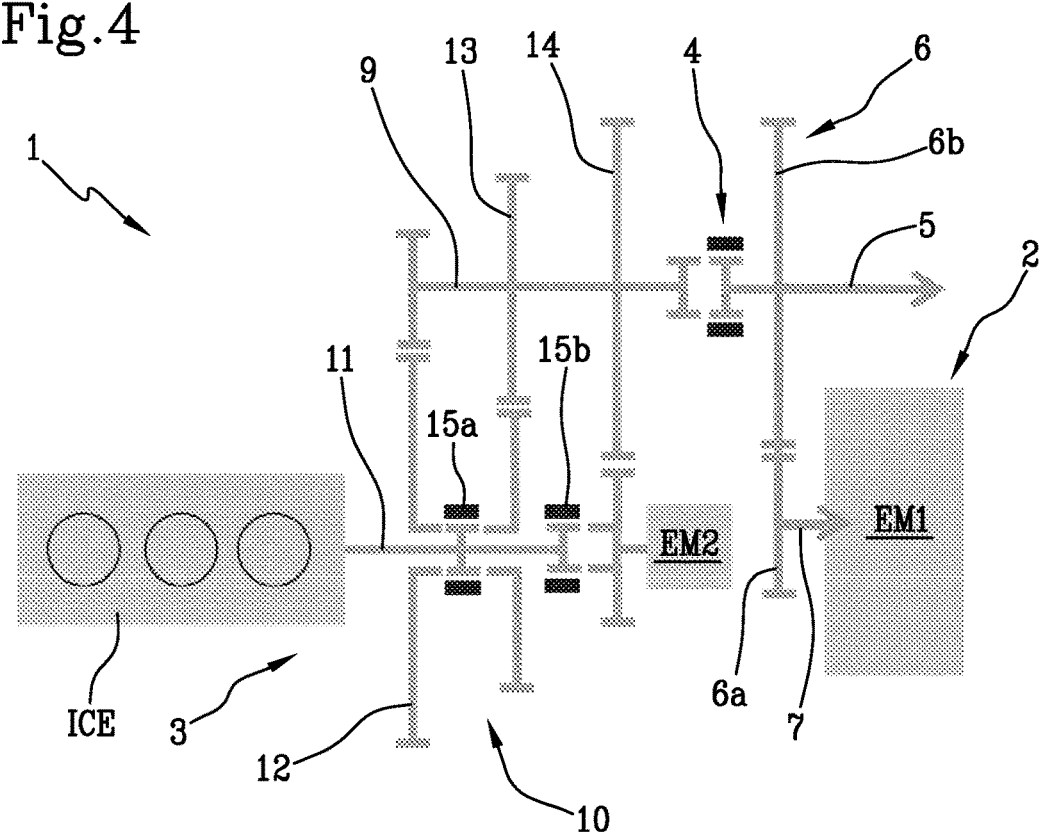
Figure 5:
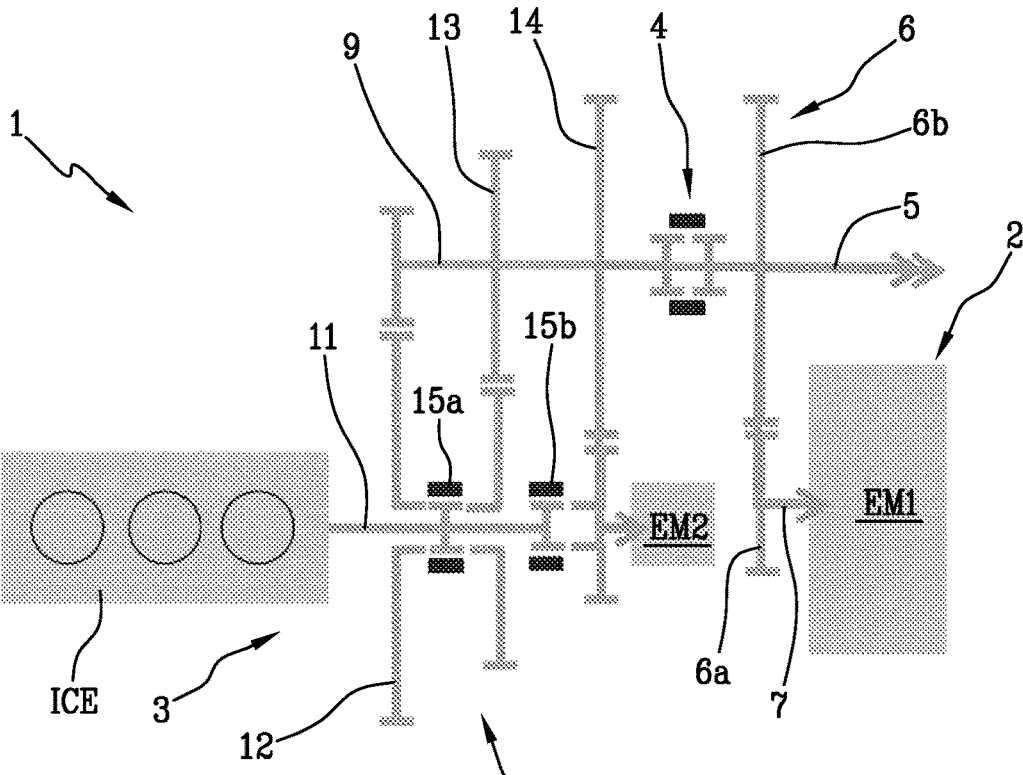
Figure 6:
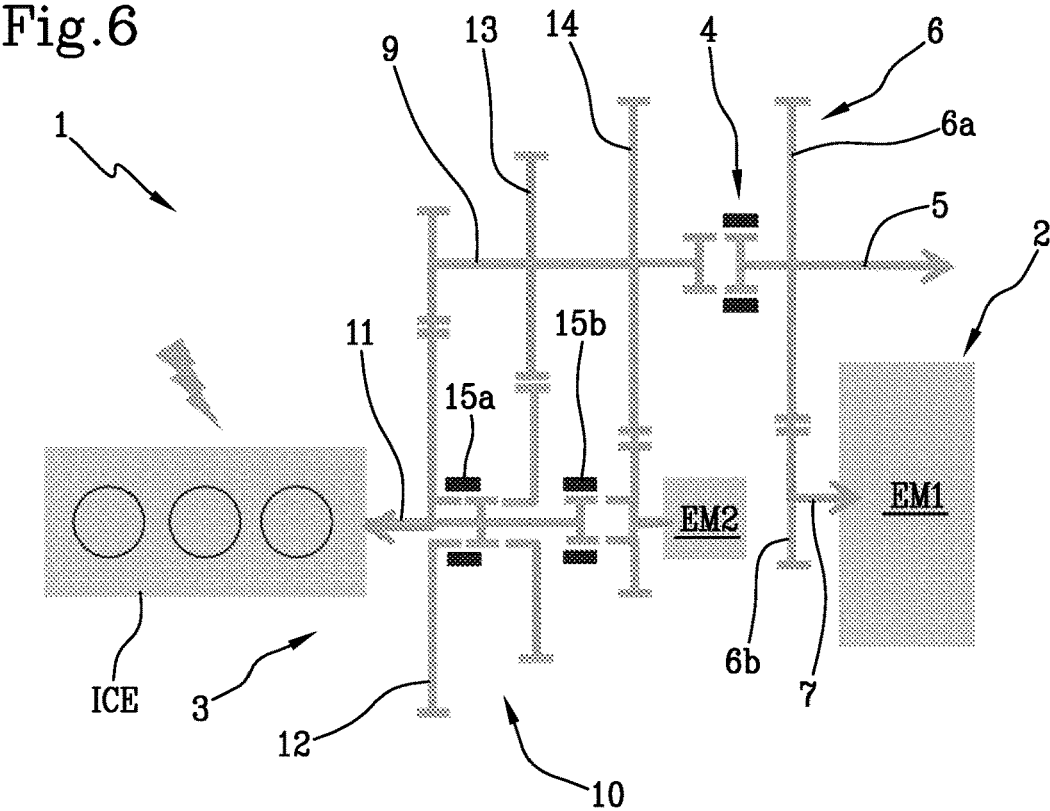
Figure 7:
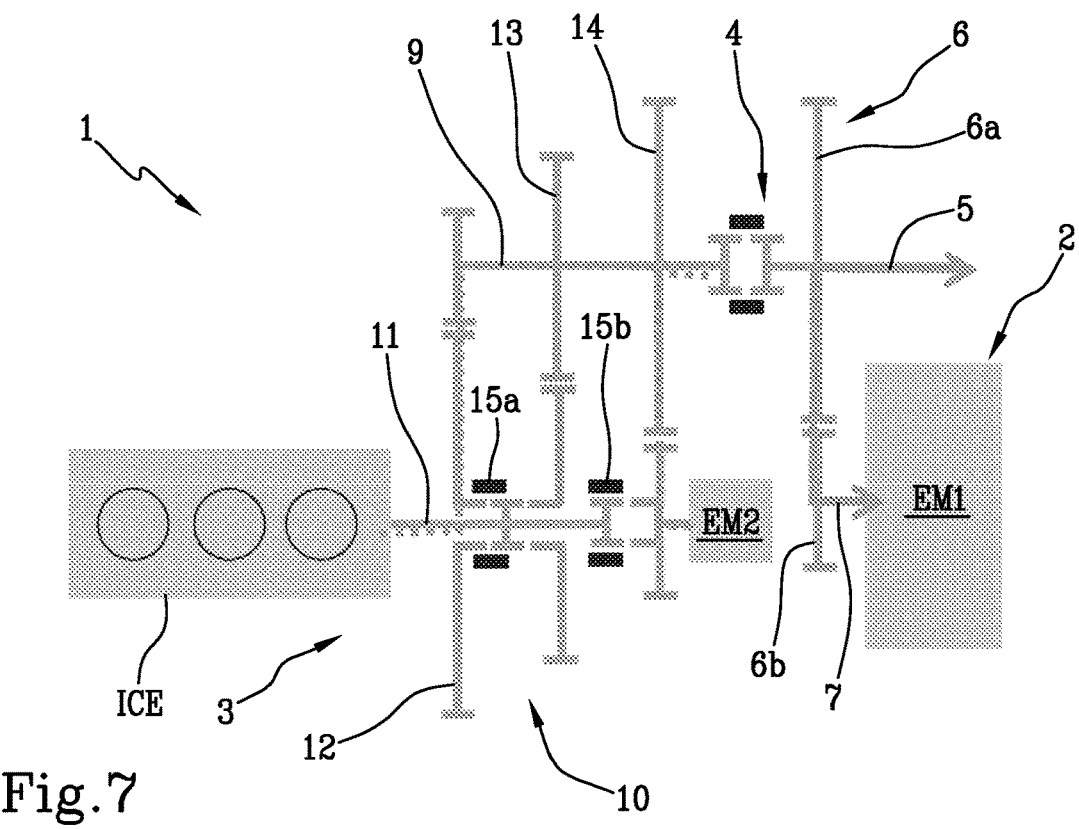
Figure 8:
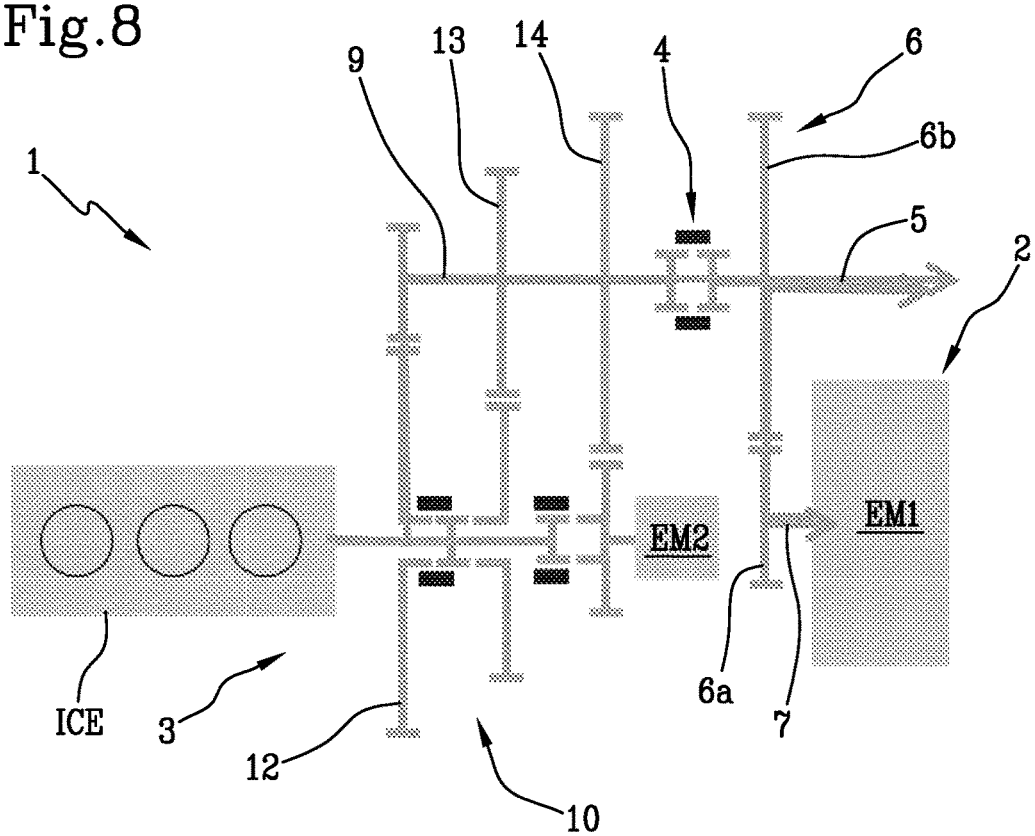
Figure 19:
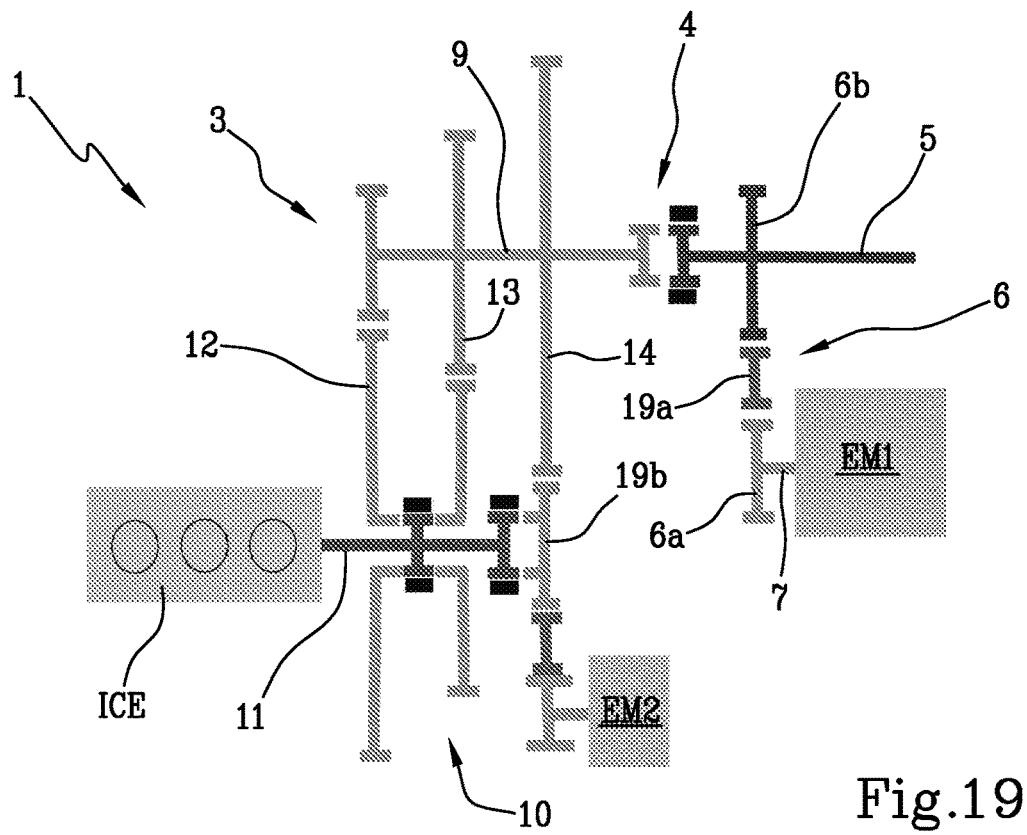

These and other characteristics, together with the related benefits, will be clearer from the following illustrative, and therefore non-limiting, description of a preferred, and thus non-exclusive, embodiment of an endothermic-electric propulsion system for a vehicle according to what is shown in the attached drawings, wherein:

FIG. 1 schematically shows an endothermic/electric hybrid propulsion system for a vehicle, in a first embodiment;

FIG. 2 schematically shows an endothermic/electric hybrid propulsion system for a vehicle, in a second embodiment;

FIGS. 2a and 2b schematically show two details of the Figure;

FIG. 3 schematically shows an endothermic/electric hybrid propulsion system for a vehicle, in a third embodiment FIGS. 4 to 13 show the endothermic/electric hybrid propulsion system in FIG. 1 in a plurality of operating configurations;

FIGS. 14 to 18 show an endothermic/electric hybrid propulsion system according to the invention, schematically placed in a hybrid vehicle according to a plurality of alternative configurations;

FIG. 19 schematically shows an endothermic/electric hybrid propulsion system for a vehicle according to the present invention, in another embodiment.

With reference to the attached Figures, number 1 indicates an endothermic/electric hybrid propulsion system for a vehicle V according to the present invention.

This propulsion system 1 is of the endothermic/electric hybrid type and fits operatively upstream of a front differential AD and/or a rear differential RD of the vehicle V.

The propulsion system 1 comprises a first propulsion unit 2, of the electrical type, and a second propulsion unit 3, of the hybrid type, which are connected by means of a coupling member 4 that can be selectively switched between an engagement condition (for example in FIG. 5), wherein it couples the first 2 and the second 3 propulsion unit, and a disengagement condition (for example in FIG. 1), wherein it disengages the second propulsion unit 3 from the first propulsion unit 2.

The coupling member 4 is preferably defined by a straight or oblique dog clutch. However, this coupling member 4 could also assume other configurations, more or less complex, as long as they are suitable for enabling a selective coupling and uncoupling of the two propulsion units 2, 3 in response to a command from the control unit CU.

For example, alternative solutions to the dog clutch could be synchronisers.

The first propulsion unit 2 is directly coupled to a differential AD of the vehicle V through a transmission shaft 5.

This first propulsion unit 2 therefore comprises at least one first electric machine EM1 coupled to the transmission shaft 5 so as to transmit torque.

In order to power the first electric machine EM1, the first propulsion unit 2 comprises a battery pack (not shown), which can be dedicated or shared with the second propulsion unit 3.

Note that the term "electric machine" means any electric motor, which can preferably be directed in both drive and power generation modes, and which is adapted for automotive applications.

Therefore, in the present text, the expression "electric machine" refers in a generic way to the actuator/electronics set that supplies (or receives) torque to the drive shaft.

The first electric machine EM1 can therefore be defined by a direct current motor, for example of the brushless type, or by an alternating current motor, both synchronous and asynchronous, according to the design specifications and without deviating from the object of the present invention.

Preferably, the first electric machine EM1 is connected to the transmission shaft 5 by at least one appropriately sized gearset 6.

In particular, the gearset 6 of the first propulsion unit 2 comprises at least a first toothed wheel 6a, which is rotatably engaged to a drive shaft 7 of the first electric machine EM1, and a second toothed wheel 6b, which is coupled to the first 6a and rotatably engaged to the transmission shaft 5.

Note that, with reference to the embodiments shown, the first electric machine EM1 is permanently coupled to the gearset 6.

Alternatively, however, an uncoupling device (e.g. a disconnect clutch) between the first electric machine EM1 and the gearset 6 could be provided, in particular between the drive shaft 7 and the first toothed wheel 6a. Such a second configuration could be useful for reasons of efficiency or safety, without however diverging from the inventive concept of the present invention.

In its preferred embodiment, the gearset 6 of the first propulsion unit 2 has a transmission ratio of more than 1, more preferably of between 2 and 4.

In some embodiments (FIGS. 3, 17, 18), the transmission shaft 5 of the first propulsion unit 2 is connected to the second propulsion unit 3 (and to the coupling member 4) through an additional shaft 8.

Advantageously, it is thus possible to provide the first propulsion unit 2 with at least two gearsets and at least one selector device in order to allow a variation of the transmission ratio between the additional shaft 8, which receives torque from the hybrid propulsion unit (i.e. the second propulsion unit 3), and the transmission shaft 5.

In the embodiment shown in FIG. 3, the first propulsion unit 2 comprises the drive shaft 7 of the first electric machine EM1, the additional shaft 8 and the transmission shaft 5, which are parallel and distinct.

The second propulsion unit 3, as said of the hybrid type, is provided with at least one internal combustion engine ICE and at least one second electric machine EM2, both coupled, or able to coupled, to an output shaft 9.

The "second electric machine EM2", like the first, can also be of any type and is connected to a battery pack, which can be the same as the first electric machine or a dedicated one; in the preferred embodiments, the first and second electric machine EM1, EM2 are of the same type.

Note that, as will be better explained below, the first electric machine EM1 is larger than the second electric machine EM2.

For example, in one embodiment, the first electric machine EM1 is designed to deliver a torque of 120 Nm (65 kW power), while the second electric machine is designed to deliver a torque of 50 Nm (25 kW power).

According to one aspect of the present invention, the second electric machine EM2 and the internal combustion engine ICE can be selectively coupled together to provide torque to said output shaft 9 independently or in combination.

In other words, the internal combustion engine ICE and the second electric machine EM2 can be directed to provide torque to the output shaft 9 in a complementary or alternative way.

The output shaft 9 of the second propulsion unit 3 can, in turn, be selectively connected to the first propulsion unit 2, preferably to the transmission shaft 5, through the coupling member 4 as described above.

Advantageously, therefore, the second propulsion unit 3 can be selectively coupled or uncoupled from the first propulsion unit 2 depending on the operating conditions of the vehicle V and on the battery pack's charge.

Moreover, when the coupling member 4 is in said disengagement condition, the second electric machine EM2 and the internal combustion engine ICE can exchange torque between them.

Preferably, the second propulsion unit 3 comprises at least one input shaft 11 associated with the internal combustion engine ICE that can be coupled to the output shaft 9.

In the embodiment shown, the second electric machine EM2 has a rotation axis that is coaxial (i.e. aligned) with the input shaft 11. Advantageously, it is thus possible to limit the number of components/gears to couple the machines of the second propulsion unit 3 to one another.

Preferably, moreover, the second propulsion unit 3 comprises at least one coupling device 16 that is operatively interposed between said input shaft 11 and the second electric machine EM2.

This coupling device 16 can be selectively switched between a first configuration, wherein it directly couples the input shaft with the second electric machine EM2, and a second configuration, wherein it disengages the input shaft from the second electric machine EM2.

Advantageously, it is thus possible to either directly couple the second electric machine EM2 to the internal combustion engine ICE, or to disengage them, so as to independently power the output shaft 9 or so as to couple them indirectly through, for example, a transmission device 10.

Preferably, therefore, the second propulsion unit 3 comprises a transmission device 10 operatively interposed between the internal combustion engine ICE and the second electric machine EM2.

This transmission device 10 has at least one first operating condition wherein it allows the transmission of torque between the second electric machine EM2 and the internal combustion engine ICE and vice versa.

In other words, in the first operating condition, the transmission device 10 allows torque/power to be transferred between the second electric machine EM2 and the internal combustion engine ICE.

In this first condition, the coupling member 4 is preferably in the disengagement condition, in order to allow the transfer of torque between the power sources of the second propulsion unit 3 without involving (at least directly) the first propulsion unit 2.

Preferably, in the first operating condition, the transmission device 10 allows the transmission of torque between the second electric machine EM2 and the internal combustion engine ICE through said output shaft 9.

The transmission device 10 also has at least one second operating condition, in which it disengages the internal combustion engine ICE from the second electric machine EM2 in order to allow the transmission of torque from the second electric machine EM2 to the output shaft 9.

Preferably, the internal combustion engine ICE can be coupled to the output shaft 9 through said transmission device 10.

Note that, in another embodiment (FIG. 19), the insertion of at least one toothed wheel (or idler wheel) is, preferably, provided to transmit the motion between the rotor shaft of the first EM1 and/or the second EM2 electric machine and the transmission shaft 5 and/or the transmission device 10.

As exemplified by FIG. 19, in fact, a first idler wheel 19a is positioned between the first electric machine EM1 and the transmission shaft 5.

In particular, the first idler wheel 19a is interposed between the first 6a and the second toothed wheel 6b of the first gearset 6.

In addition, a second idler wheel 19b is, preferably, positioned between the second electric machine EM2 and the transmission device 10.

Advantageously, this embodiment allows greater freedom in designing the propulsion system.

In its preferred embodiment, the transmission device comprises a plurality of gearsets 12, 13, 14 defining a corresponding plurality of transmission ratios between the input shaft 11 and the output shaft 9.

Preferably, the number of transmission ratios is reduced compared to the number traditionally used in current vehicles (typically from 5 to 7).

Advantageously, the mechanical part of the transmission, which is supplemented where necessary by the contribution of the electric machines EM1, EM2 (as will be better explained below), is thus simplified as much as possible.

Preferably, the transmission device comprises at least a first 14, a second 13 and a third gearset 12 defining a first, a second and a third transmission ratio respectively between the input shaft 11 and the output shaft 9.

Each gearset 12, 13, 14 is defined by a first toothed wheel fitted to the input shaft 11 and a second toothed wheel fitted to the output shaft 9.

Note that transmission ratios preferably decrease from first to third. In other words, the first transmission ratio, produced by the first gearset 14, corresponds to a high gearing down ratio, which can mainly be used at low speeds and during breakaway.

The second transmission ratio, produced by the second gearset 13, corresponds to an average ratio that is lower than the first.

The third transmission ratio, produced by the third gearset 12, corresponds to a reduced gearing down ratio, which can be used to transmit torque from the internal combustion engine ICE to the output shaft 9 at high speeds.

In the embodiment shown:
the first transmission ratio is between 2.5 and 3.7;
the second transmission ratio is between 1.3 and 1.9;
the third transmission ratio is between 0.7 and 0.9.

The transmission device 10 also comprises at least two selector members 15 that are operatively interposed between the input shaft 11 (or output shaft 9) and said gearsets 12, 13, 14.

The transmission device 10 comprises, preferably, a first selector member 15b operatively interposed between the input shaft 11 and said first gearset 14.

The first selector member 15b can therefore be selectively switched between at least two operating conditions: one coupling condition, with the first gearset 14, and one neutral one.

The transmission device 10 also comprises a second selector member 15a operatively interposed between the input shaft 11 and said second 13 and third gearsets 12 in order to alternately select the second or third reduction ratio.

Therefore, the second selector member 15a can be selectively switched between three operating conditions: one of coupling with the third gearset 12, one of coupling with the second gearset 13, and one neutral condition.

Note that the expression "selector member" is used in the present text to define any type of device capable of coupling/uncoupling and synchronising the input shaft 11 (or output shaft 9) with the relative toothed wheel of the coupling.

For example, dog clutches, synchronisers and other types of selectors known today could be used.

With reference to the embodiment in FIG. 1, the second electric machine EM2 is rigidly coupled to the first gearset 14; in this embodiment, the first selector member 15b corresponds to the coupling device 16 between the input shaft 11 and the second electric machine EM2.

In the variant of this embodiment shown in FIG. 19, the second electric machine EM2 is coupled to the first gearset 14 by means of the second idler wheel 19a.

Alternatively, with reference to the embodiment in FIG. 2, the first selector member 15b and the coupling device 16 are distinct members and can be directed independently.

More precisely, in its preferred embodiment, the second electric machine EM2 is disengaged from any gearset. The first selector member 15b is operatively interposed between the input shaft 11 and the first gearset 14 (or possibly to another). The coupling device 16 is instead operatively interposed between the second electric machine EM2 (or one of its drive shafts) and the input shaft 11.

More precisely, in this embodiment, the coupling device 16 is a selector member coupled to the second electric machine EM2 and can be selectively switched between a first condition, in which it couples the second electric machine EM2 to the (first) gearset, and a second condition, in which it directly couples the second electric machine EM2 to the input shaft 11.

Advantageously, it is thus possible to adopt a plurality of different operating configurations simply by directing the 15a, 15b, 16 selector members.

For example (FIG. 2a), by coupling the internal combustion engine with the second 13 or third 12 gearset and directing the coupling device 16 in the first condition, it is possible to supply torque to the output shaft 9 in parallel, both through the internal combustion engine ICE, with the second or third transmission ratio, and through the second electric machine EM2, with the first transmission ratio.

Alternatively (FIG. 2b), it is possible to disengage the input shaft 11 from all the gearsets 12, 13, 14 and bring the selector member to the second condition in order to directly couple the internal combustion engine ICE with the second electric machine EM2, thus maximising transmission efficiency and limiting losses and mechanical play due to the interposition of the toothed wheels. This configuration is particularly useful in the generation condition, wherein the internal combustion engine ICE powers the second electric machine EM2.

In another alternative configuration, the input shaft 11 is engaged with the first gearset 14 by means of the second selector member and, at the same time, the second electric machine EM2 is connected to the same gearset 14.

Note that the presence of the selector 15 and the coupling 4 members allows the input shaft 11 of the second propulsion unit 3 to be completely disengaged from both the output shaft 9 and, above all, from the transmission shaft 5.

Advantageously, the need for a clutch between the internal combustion engine ICE and the input shaft, which in its preferred embodiment is rigidly connected to the drive shaft, is thus eliminated.

For the purpose of moving/directing all (or part of) the embodiments, the propulsion system comprises, or is associated with, a control unit ECU.

This control unit ECU is configured to direct the first 2 and the second 3 propulsion unit in a plurality of operating configurations by appropriately actuating the first electric machine EM1, the second electric machine EM2, the internal combustion engine ICE, the coupling member 4 and/or the selector members and any other actuators present in the system.

For example, the control unit ECU is configured to direct the first 2 and the second 3 propulsion unit in a first electric propulsion configuration (FIG. 4), wherein the coupling member 4 is in said disengagement condition and said first electric machine EM1 transmits torque to the transmission shaft 5.

In this full electric configuration, traction is only created by the first electric machine EM1.

Advantageously, since the first electric machine EM1 is directly coupled to the differential, the first electric propulsion configuration is particularly efficient both in accelerating and in regenerative braking, in that the kinematic chain's number of mechanical parts is minimised.

In addition, the control unit ECU is, preferably, configured to direct the first 2 and the second 3 propulsion unit in a second electric propulsion configuration (FIG. 5), wherein:
  the coupling member 4 is in said engagement condition;
  the first electric machine EM1 transmits torque to the transmission shaft 5;
  the second electric machine EM2 transmits torque to said output shaft 9 of the second propulsion unit 2;
  the internal combustion engine ICE is uncoupled from said output shaft 9 (and preferably switched off); in particular, the selector members 15 are both in a neutral position in order to prevent the transmission of torque from the input shaft 11 to the output shaft 9.

Therefore, in this configuration, which is also full electric, the traction is created in a combined way by the first EM1 and the second EM2 electric machine.

In this respect, note that the control unit ECU is preferably programmed to set the first and/or the second electric propulsion configuration for low speeds, below a predetermined threshold (e.g. below 80 km/h), and for sufficiently high battery pack charge levels (i.e. above a threshold).

Advantageously, the natural readiness of electric motors, in terms of acceleration, is thus exploited in the urban cycle, while also improving comfort for the driver and/or passengers thanks to the lack of gear changes.

Moreover, the control unit ECU is preferably configured to direct the first 2 and the second 3 propulsion unit in an electric-hybrid transition configuration (FIG. 6-7), wherein:
  the coupling member 4 is in said disengagement condition;
  the second electric machine EM2 transmits torque to the internal combustion engine ICE.

Advantageously, the second electric machine EM2 is thus used to start the internal combustion engine ICE (cranking).

Preferably, in this transition configuration the control unit ECU is configured to:
  direct the coupling device 16 between the input shaft 11 of the second propulsion unit 2 and the second electric machine EM2 in the second configuration, in order to uncouple them;

direct the second selector member 15a in order to engage the second 13 or the third gearset 12 with said input shaft 11, in order to increase the transmission ratio between the second electric machine EM2 and the internal combustion engine ICE.

In this configuration, the control unit ECU is preferably configured to direct the second selector member 15a in order to engage the third gearset 12 with the input shaft 11, in order to maximise the reduction ratio.

Advantageously, the transmission device is thus used to transmit torque from the second electric machine EM2 to the input shaft 11, and therefore, indirectly, to the internal combustion engine ICE, advantageously using the multiple transmission ratios.

In fact, the rotation of the second electric machine EM2, coupled with the first wheel of the first gearset 14, causes the rotation of the same to be transmitted with a reduced rotation speed to the output shaft 9.

Since the output shaft 9 is uncoupled from the first propulsion unit 2 (coupling member 4 disengaged) the torque is transmitted from the first gearset to the third 12 (or possibly to the second 13).

Therefore, in consideration of the fact that this third gearset 12 has a high transmission ratio from the input shaft 11 to the output shaft 9, travelling the same from the second to the first toothed wheel, it is possible to significantly reduce the rotation speed that is transmitted and, therefore, the torque that is required by the second electric machine EM2 to start the internal combustion engine.

Advantageously, therefore, by using the transmission device 10 and the coupling member 4 it is possible to design a propulsion system wherein the second electric machine EM2 has a reduced size, to the benefit of the system's compactness and its adaptability to various conditions of use.

Moreover, in the transition configuration, the control unit ECU is preferably configured to direct the second electric machine EM2 and the internal combustion engine ICE in such a way as to bring the output shaft 9 of the second propulsion unit 3 to the same rotation speed as the transmission shaft 5 of the first propulsion unit 2.

In other words, in the transition configuration, the control unit ECU is programmed to direct the second propulsion unit 3 in a first mode (FIG. 6)—the ignition mode—and in a subsequent second mode (FIG. 7)—the synchronisation mode.

Note that, the selector members 15 and the coupling device 16 preferably remain in the same condition both in the ignition mode and in the synchronisation mode.

In fact, the difference between the two modes is mainly defined by the torque flow associated with the internal combustion engine ICE, which is absorbed in the ignition mode while it is generated in the synchronisation mode.

This synchronisation mode can be used by the control unit ECU not only during electric-hybrid transition, but also during the transmission ratio change (FIG. 13), thus obviating the need for traditional synchronisers or clutches on the transmission device 10.

Another configuration wherein the control unit ECU can direct the system is a hybrid propulsion configuration (FIGS. 8-11), which can preferably be set following the transition configuration described above.

In this configuration:
the coupling member 4 is in said engagement condition;
the first electric machine EM1 transmits torque to the transmission shaft 5;
the internal combustion engine ICE transmits torque to said output shaft 9 of the second propulsion unit 3.

The second electric machine EM2 also, preferably, transmits torque to the output shaft 9.

Therefore, depending on the operating conditions and on the battery pack's state of charge, the control unit ECU can appropriately modulate the intervention of the electric machines EM1, EM2 and of the internal combustion engine ICE, operating both on their driving and on the transmission device 10.

Figure 10:
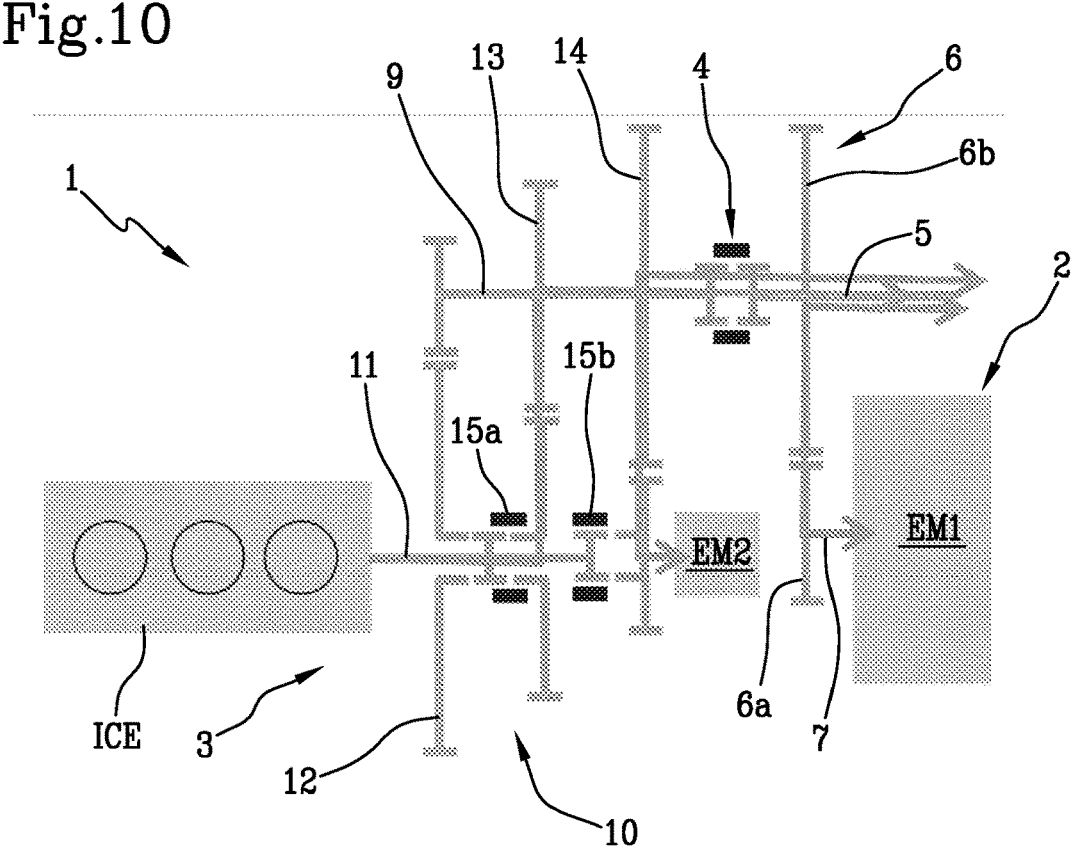
Figure 11:
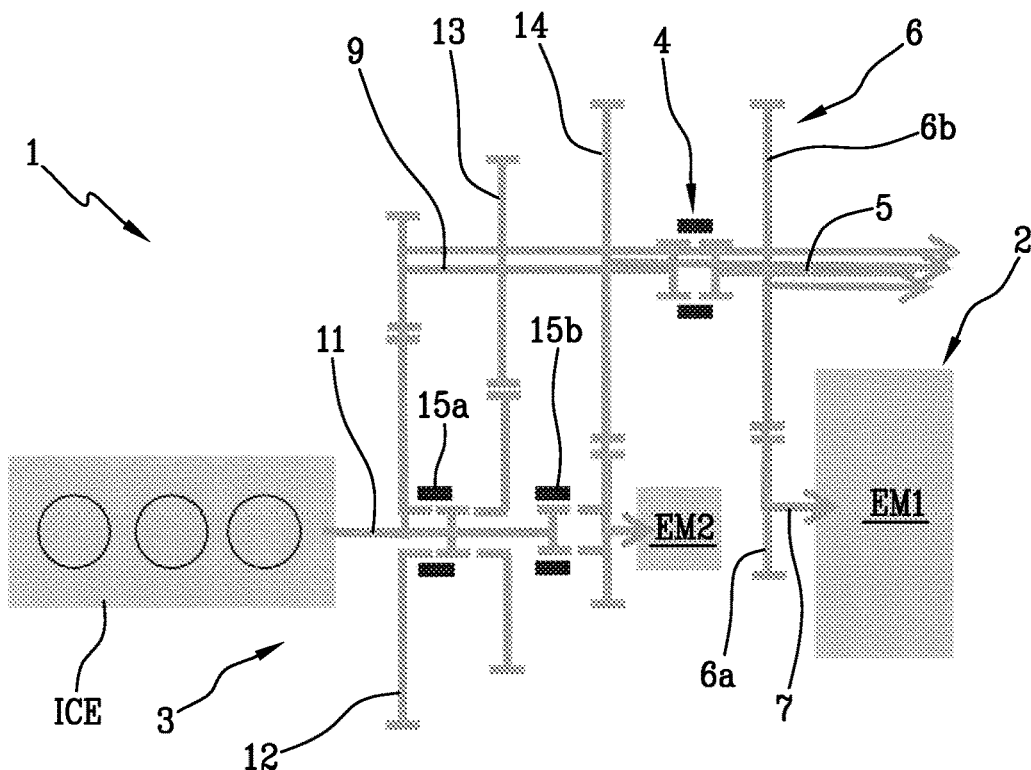
Figure 12:
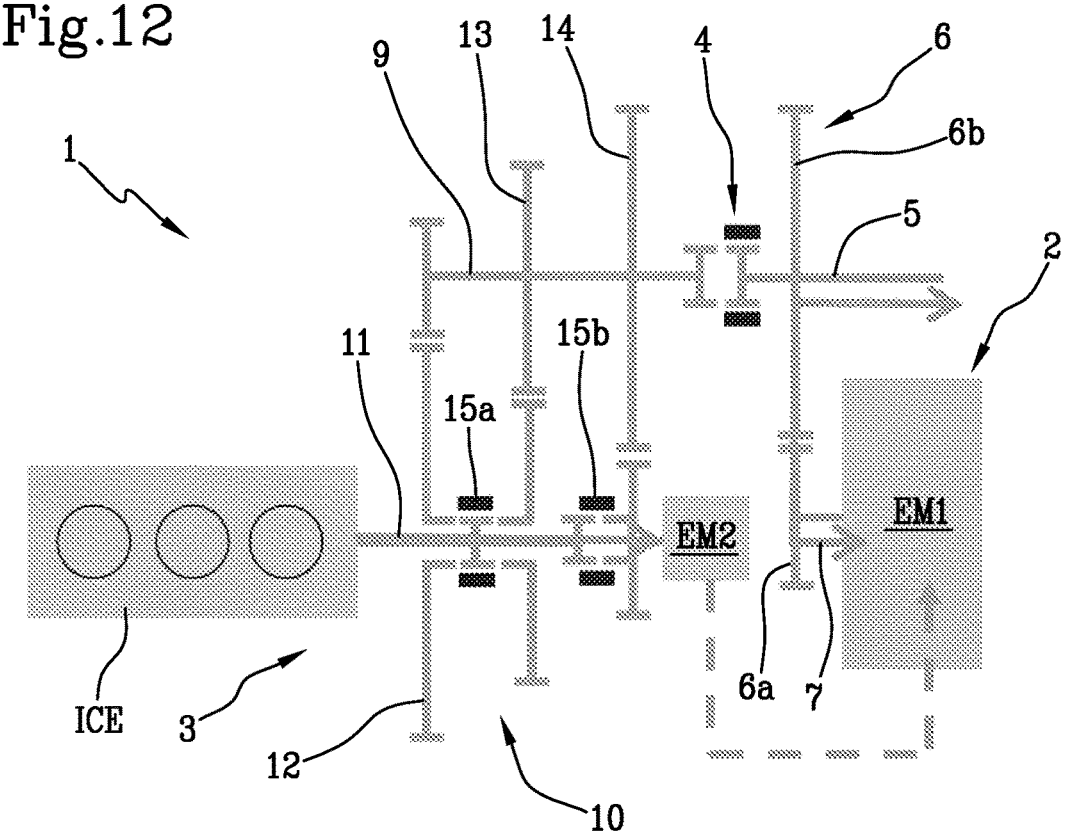
Figure 13:
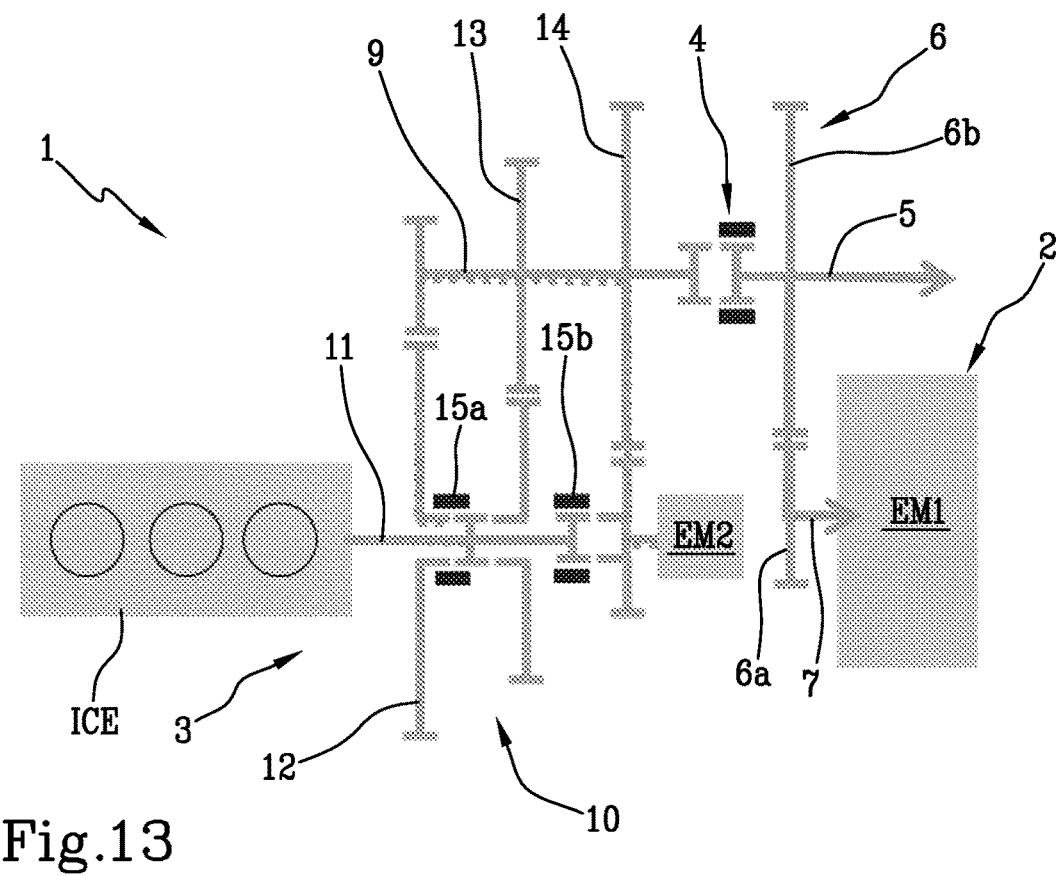

For example, the internal combustion engine ICE could in fact transmit torque to the output shaft 9 through the second 13 or third 12 gearset, while the second electric machine EM2 could be switched off (FIG. 8) or transmit torque through the first gearset 14 (FIG. 10-11).

Figure 9:
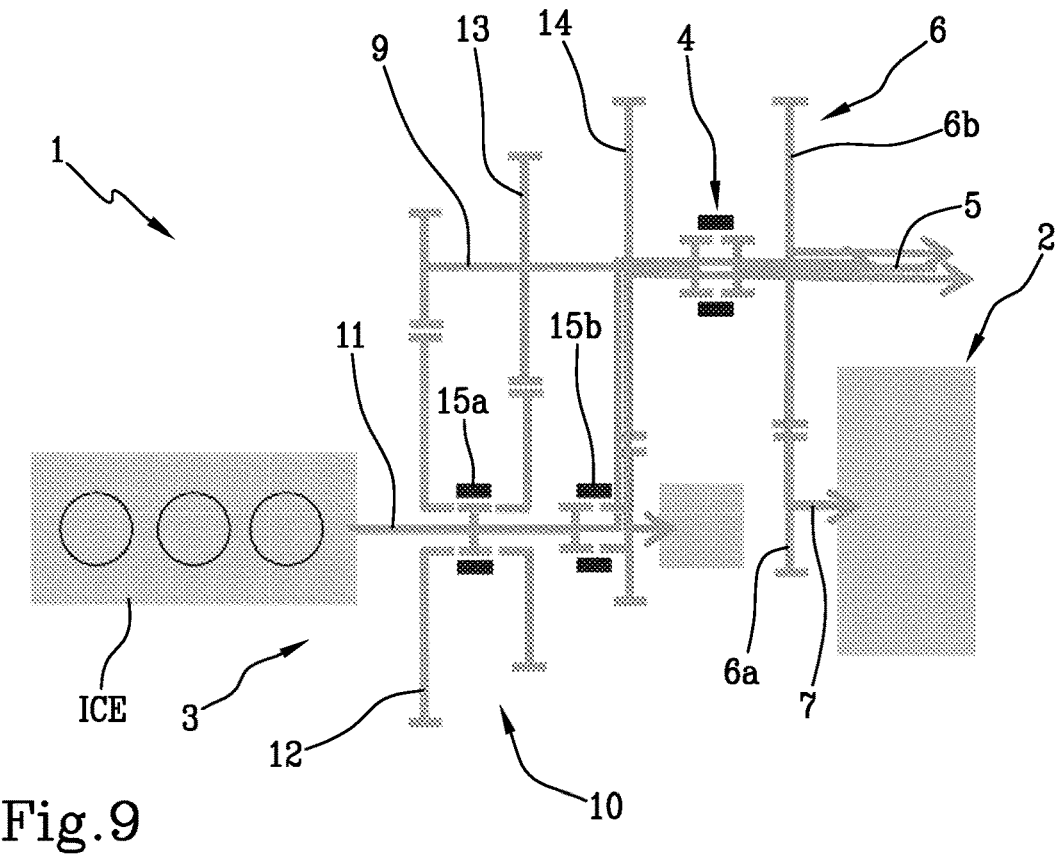

Alternatively, the internal combustion engine ICE and the second electric machine EM2 could transmit torque simultaneously through the third gearset, thus providing maximum agility and flexibility of operation (FIG. 9).

Advantageously, the ability to modulate the intervention of the electric machines EM1, EM2 as much as possible allows the speed of the internal combustion engine ICE to be kept within the scope of maximum efficiency, enabling both the maximising of performance and the limiting, as much as possible, of consumption.

This, in addition to maximising the efficiency of the propulsion system 1, allows the manufacturer to standardise, as much as possible, the structure of the same, for example using a single type of internal combustion engine ICE, possibly modifying only the electric motors depending on the model (or vice versa).

In this respect, note that the ECU control unit is preferably programmed to set the hybrid propulsion configuration (or a possible endothermic propulsion configuration) for high speeds, above a predetermined threshold (e.g. 80 km/h) and/or for particularly low battery pack charge levels (e.g. above a threshold) and/or for acceleration demands above a certain threshold.

Advantageously, the internal combustion engine is thus used under conditions of maximum efficiency, i.e. when the power demand is high and stable.

In another embodiment, the control unit ECU is configured for directing the first 2 and the second 3 propulsion unit in at least one regeneration configuration (FIG. 12), wherein:
the coupling member 4 is in said disengagement condition;
the internal combustion engine ICE transmits torque to the second electric machine EM2;
the second electric machine EM2 transmits electrical energy to the battery pack or directly to the first electric machine EM1;
the first electric machine EM1 transmits torque to the transmission shaft 5.

In this configuration, therefore, the internal combustion engine ICE is used at least in part to power the second electric machine EM2 and, indirectly, the first electric machine EM1. In this way, the internal combustion engine ICE is driven at speed, in conditions of maximum efficiency, effectively transferring all the driving variations linked to its driving to the first electric machine EM1.

Advantageously, the design of the system that is described above allows you to connect the power sources (ICE, EM1, EM2) to the kinematics of the vehicle V in a variety of modes that basically cover the entire product range.

Figure 14:
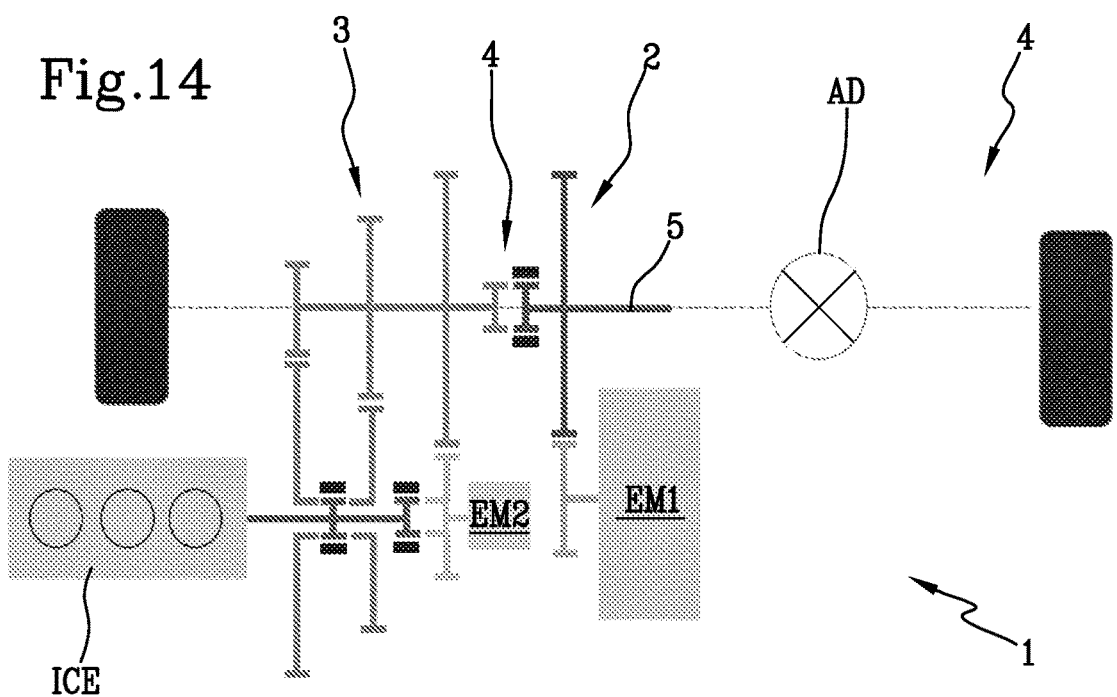

For example, with reference to FIG. 14 it is possible to appreciate the propulsion system 1 oriented transversely in a vehicle's direction of travel with the transmission shaft 5 directly engaged in the front differential AV.

Figure 15:
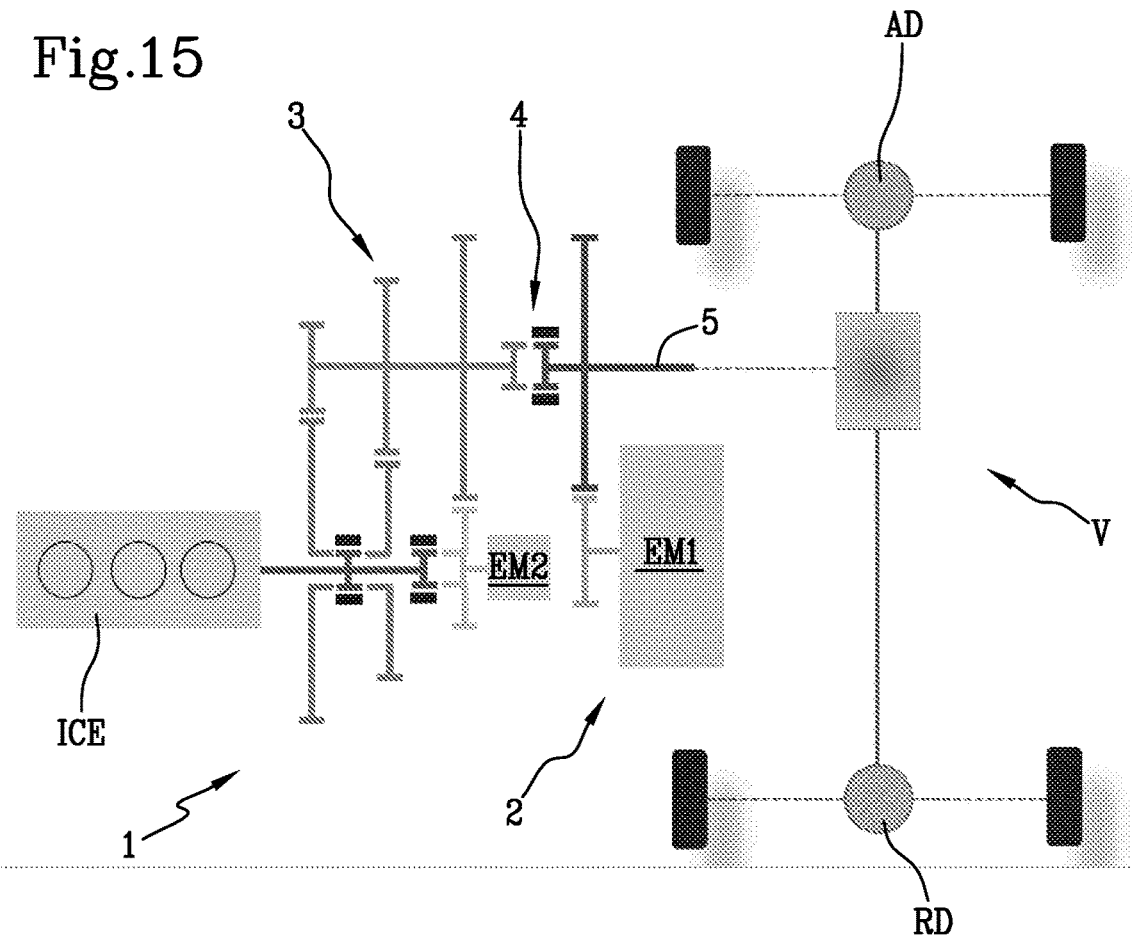

Alternatively, in FIG. 15 it can be seen how the same propulsion system can be connected to an all-wheel drive system's central differential.

FIG. 16, on the other hand, shows the propulsion system 1 wherein the second propulsion unit can be coupled independently from the first to the only rear differential.

This solution, while requiring another shaft 17 and another coupling member 18, allows considerable flexibility of use in front-wheel drive, in rear-wheel drive, or in all-wheel drive mode.

FIG. 17 shows the propulsion system 1 of FIG. 3, which is oriented longitudinally towards the direction of travel.

Figure 18:
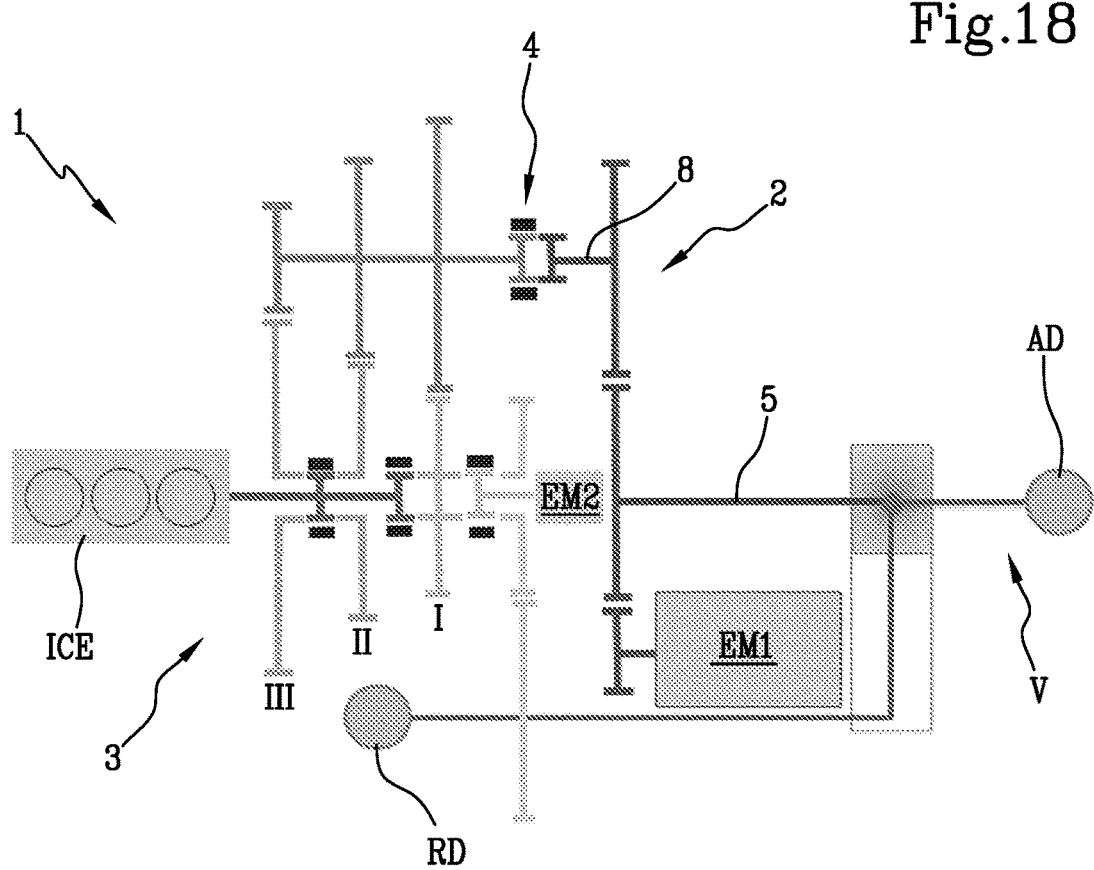

Another option is shown in FIG. 18, wherein the propulsion system 1 is oriented longitudinally but allows, in a similar way to that shown in FIG. 16, the independent coupling of the first 2 and the second propulsion units 3 to the front and rear axles.

The invention achieves its pre-established purposes and significant benefits are thus obtained.

In fact, the structure of the system, which is divided into two distinct sub-units, allows maximum flexibility and driving efficiency.

In particular, the presence of an electric propulsion unit directly connected to the differential makes the system more ready and reduces losses.

Moreover, the ability to uncouple the electric sub-unit from the hybrid one facilitates the driving of the latter, both during ignition and synchronisation.

In particular, the presence of an hybrid sub-unit that can be isolated and driven independently allows the use of mechanical clutches and/or synchronisers to be reduced or avoided, thus considerably simplifying the structure of the system.

Furthermore, the presence of a multi-ratio transmission device, at the ends of which the internal combustion engine and the second electric machine are connected, allows the minimisation of the machine's size, while maximising the transmission ratio during ignition and appropriately modulating the ratios during synchronisation.

The invention claimed is:

1. An endothermic/electric hybrid propulsion system for a vehicle, comprising:
    an electrical first propulsion unit including at least a first electric machine coupled to a transmission shaft, in which said transmission shaft is coupled to a differential of said vehicle;
    a hybrid second propulsion unit including an output shaft, at least one internal combustion engine, and at least a second electric machine which are selectively couplable together to provide torque to said output shaft in an independent or combined manner;
    a coupling member operatively interposed between the output shaft of the second propulsion unit and the transmission shaft of the first propulsion unit, wherein said coupling member is selectively switchable between an engagement condition in which said coupling member couples said first propulsion unit and said second propulsion unit, and a disengagement condition, in which said coupling member disengages the second propulsion unit from the first propulsion unit;
    wherein the second propulsion unit comprises a transmission device operatively interposed between the internal combustion engine and the second electric machine and having at least a first operating condition in which said transmission device allows the transmission of torque from the second electric machine to the internal combustion engine through said output shaft,
    wherein the transmission device comprises a plurality of gearsets defining a corresponding plurality of transmission ratios between an input shaft and said output shaft of the second propulsion unit; said internal combustion engine being coupled to said input shaft.

2. The propulsion system according to claim 1, wherein transmission device has at least a second operating condition in which said transmission device disengages the internal combustion engine from the second electric machine to allow the transmission of torque from the second electric machine to the output shaft.

3. The propulsion system according to claim 1, wherein the transmission device comprises at least one coupling device operatively interposed between said input shaft and said second electric machine which is selectively switchable between a first configuration, in which the coupling device directly couples the input shaft to the second electric machine, and a second configuration, in which said coupling device disengages the input shaft from the second electric machine.

4. The propulsion system according to claim 1, wherein the transmission device comprises:
    wherein the plurality of gearsets comprises at least a first, a second, and a third gearset defining a first, a second, and a third transmission ratio respectively, decreasing in value, between the input shaft and the output shaft;
    at least two selector members operatively interposed between the input shaft and said gearsets.

5. The propulsion system according to claim 4, wherein said at least two selector members comprise:
    a first selector member operatively interposed between the input shaft and said first gearset;
    a second selector member operatively interposed between the input shaft and said second and third gearsets.

6. The propulsion system according to claim 5, wherein said second electric machine is rigidly coupled to the first gearset and wherein said first selector member corresponds to said coupling device between the input shaft and the second electric machine.

7. The propulsion system according to claim 4, and further, comprising a control unit configured to direct said first and second propulsion units into at least:
    a first electric propulsion configuration, in which the coupling member is in said disengagement condition, and said first electric machine transmits torque to the transmission shaft;
    a second electric propulsion configuration, in which the coupling member is in said engagement condition, said first electric machine transmits torque to the transmission shaft, said second electric machine transmits torque to said output shaft of the second propulsion unit, and said internal combustion engine is uncoupled from said output shaft;
    an electric-hybrid transition configuration, in which the coupling member is in said disengagement condition and said second electric machine transmits torque to the internal combustion engine;
    a hybrid propulsion configuration, in which the coupling member is in said engagement condition, said first electric machine transmits torque to the transmission shaft, and said internal combustion engine transmits torque to said output shaft of the second propulsion unit.

8. The propulsion system according to claim 7, wherein the control unit is configured to direct said first and second propulsion units into at least one regeneration configuration, wherein:
the coupling member is in said disengagement condition;
the internal combustion engine transmits torque to the second electric machine;
the second electric machine transmits electrical energy to a battery pack or directly to the first electric machine;
the first electric machine transmits torque to the transmission shaft.

9. The propulsion system according to claim 7, wherein, in said electric-hybrid transition configuration, the control unit is configured to direct the coupling device into said second configuration and the second selector member so as to engage the third gearset with said input shaft, to maximize a transmission ratio between the second electric machine and the internal combustion engine.

10. The propulsion system according to claim 7, wherein, in said electric-hybrid transition configuration, the control unit is configured to direct the second electric machine and the internal combustion engine in order to bring the output shaft of the second propulsion unit to a same rotation speed as the transmission shaft of the first propulsion unit.

11. The propulsion system according to claim 1, wherein the first electric machine is connected to the transmission shaft through a respective gearset.

12. The propulsion system according to claim 1, wherein the first electric machine is larger than the second electric machine.

13. The propulsion system according to claim 1, wherein the second electric machine has a rotation axis coaxial with said input shaft.

14. The propulsion system according to claim 1, and further comprising at least one battery pack connected to said first and said second electric machine and configured to exchange energy therewith.

15. An endothermic/electric hybrid propulsion system for a vehicle, comprising:
an electrical first propulsion unit including at least a first electric machine coupled to a transmission shaft, in which said transmission shaft is coupled to a differential of said vehicle;
a hybrid second propulsion unit including an output shaft, at least one internal combustion engine, and at least a second electric machine which are selectively couplable together to provide torque to said output shaft in an independent or combined manner;
a coupling member operatively interposed between the output shaft of the second propulsion unit and the transmission shaft of the first propulsion unit, wherein said coupling member is selectively switchable between an engagement condition in which said coupling member couples said first propulsion unit and said second propulsion unit, and a disengagement condition, in which said coupling member disengages the second propulsion unit from the first propulsion unit;
wherein the transmission device comprises:
wherein the plurality of gearsets comprises at least a first, a second, and a third gearset defining a first, a second, and a third transmission ratio respectively, decreasing in value, between the input shaft and the output shaft;
at least two selector members operatively interposed between the input shaft and said gearsets;
a control unit configured to direct said first and second propulsion units into at least:
a first electric propulsion configuration, in which the coupling member is in said disengagement condition, and said first electric machine transmits torque to the transmission shaft;
a second electric propulsion configuration, in which the coupling member is in said engagement condition, said first electric machine transmits torque to the transmission shaft, said second electric machine transmits torque to said output shaft of the second propulsion unit, and said internal combustion engine is uncoupled from said output shaft;
an electric-hybrid transition configuration, in which the coupling member is in said disengagement condition and said second electric machine transmits torque to the internal combustion engine;
a hybrid propulsion configuration, in which the coupling member is in said engagement condition, said first electric machine transmits torque to the transmission shaft, and said internal combustion engine transmits torque to said
output shaft of the second propulsion unit;
wherein, in said electric-hybrid transition configuration, the control unit is configured to direct the coupling device into said second configuration and the second selector member to engage the third gearset with said input shaft, to maximize a transmission ratio between the second electric machine and the internal combustion engine.

16. An endothermic/electric hybrid propulsion system for a vehicle, comprising:
an electrical first propulsion unit including at least a first electric machine coupled to a transmission shaft, in which said transmission shaft is coupled to a differential of said vehicle;
a hybrid second propulsion unit including an output shaft, at least one internal combustion engine, and at least a second electric machine which are selectively couplable together to provide torque to said output shaft in an independent or combined manner;
a coupling member operatively interposed between the output shaft of the second propulsion unit and the transmission shaft of the first propulsion unit, wherein said coupling member is selectively switchable between an engagement condition in which said coupling member couples said first propulsion unit and said second propulsion unit, and a disengagement condition, in which said coupling member disengages the second propulsion unit from the first propulsion unit;
a control unit configured to direct said first and second propulsion units into at least:
a first electric propulsion configuration, in which the coupling member is in said disengagement condition, and said first electric machine transmits torque to the transmission shaft;
a second electric propulsion configuration, in which the coupling member is in said engagement condition, said first electric machine transmits torque to the transmission shaft, said second electric machine transmits torque to said output shaft of the second propulsion unit, and said internal combustion engine is uncoupled from said output shaft;
an electric-hybrid transition configuration, in which the coupling member is in said disengagement condition and said second electric machine transmits torque to the internal combustion engine;

a hybrid propulsion configuration, in which the coupling member is in said engagement condition, said first electric machine transmits torque to the transmission shaft, and said internal combustion engine transmits torque to said output shaft of the second propulsion unit;

wherein, in said electric-hybrid transition configuration, the control unit is configured to direct the second electric machine and the internal combustion engine to bring the output shaft of the second propulsion unit to a same rotation speed as the transmission shaft of the first propulsion unit.

\* \* \* \* \*